US008108797B2

(12) United States Patent
Stautner et al.

(10) Patent No.: US 8,108,797 B2
(45) Date of Patent: *Jan. 31, 2012

(54) INTEGRATED CONTENT GUIDE FOR INTERACTIVE SELECTION OF CONTENT AND SERVICES ON PERSONAL COMPUTER SYSTEMS WITH MULTIPLE SOURCES AND MULTIPLE MEDIA PRESENTATION

(75) Inventors: John P. Stautner, The Woodlands, TX (US); Richard J. Lawson, Dakota Dunes, SD (US); Brian V. Belmont, Dallas, TX (US)

(73) Assignee: Exaflop LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/700,429

(22) Filed: Feb. 4, 2010

(65) Prior Publication Data

US 2010/0138487 A1    Jun. 3, 2010

Related U.S. Application Data

(63) Continuation of application No. 12/180,680, filed on Jul. 28, 2008, now Pat. No. 7,694,235, which is a continuation of application No. 10/628,640, filed on Jul. 28, 2003, now Pat. No. 7,418,672, which is a continuation of application No. 09/742,602, filed on Dec. 21, 2000, now Pat. No. 6,600,503, which is a continuation of application No. 08/726,648, filed on Oct. 7, 1996, now Pat. No. 6,172,677.

(51) Int. Cl.
*G06F 3/00* (2006.01)
*H04N 7/173* (2006.01)

(52) U.S. Cl. ........ 715/835; 715/716; 715/810; 715/855; 725/39; 725/40; 725/51; 725/59; 725/61

(58) Field of Classification Search .......... 715/716–718, 715/720, 721, 723, 733, 762, 765, 810, 825, 715/835, 840, 854, 855, 962, 205; 725/37–40, 725/42, 48, 51, 59–61, 64; 707/705, 781, 707/802, 803, 805
See application file for complete search history.

(56) References Cited

U.S. PATENT DOCUMENTS 4,628,541 A    12/1986 Beavers
4,658,247 A    4/1987 Gharachorloo
(Continued)

FOREIGN PATENT DOCUMENTS

EP    0624039 A2    11/1994
(Continued)

OTHER PUBLICATIONS

"An overview of the phase-locked loop (PLL)", Application Note/AN177, Philip Semiconductors, Dec. 1988, pp. 1-6.
(Continued)

*Primary Examiner* — Xiomar L Bautista

(57) ABSTRACT

A integrated content guide for multiple sources is provided with hyper-text type links to allow for the selection of various programs. The hyper-text links are provided for a transmitted and then stored digital bit stream. This allows for the embedding within the content guide what could be additional commercial information. The embedding may also be as to additional information for other related television or radio shows or the like. Information can be additional television shows, related information or activities on on-line services or automatic telephone ordering of products or services being displayed.

90 Claims, 5 Drawing Sheets

U.S. PATENT DOCUMENTS

| | | | |
|---|---|---|---|
| 4,775,928 | A | 10/1988 | Kendall et al. |
| 4,954,819 | A | 9/1990 | Watkins |
| 5,261,044 | A | 11/1993 | Dev et al. |
| 5,291,275 | A | 3/1994 | Lumelsky |
| 5,451,981 | A | 9/1995 | Drako |
| 5,479,266 | A | 12/1995 | Young et al. |
| 5,488,393 | A | 1/1996 | Wood et al. |
| 5,502,462 | A | 3/1996 | Mical et al. |
| 5,543,824 | A | 8/1996 | Priem et al. |
| 5,550,576 | A | 8/1996 | Klosterman |
| 5,559,548 | A | 9/1996 | Davis et al. |
| 5,572,543 | A | 11/1996 | Heinemann et al. |
| 5,572,643 | A | 11/1996 | Judson |
| 5,572,698 | A | 11/1996 | Yen et al. |
| 5,585,838 | A | 12/1996 | Lawler et al. |
| 5,589,892 | A | 12/1996 | Knee et al. |
| 5,592,551 | A | 1/1997 | Lett et al. |
| 5,610,663 | A | 3/1997 | Nan et al. |
| 5,621,456 | A | 4/1997 | Florin et al. |
| 5,623,613 | A | 4/1997 | Rowe et al. |
| 5,629,733 | A | 5/1997 | Youman et al. |
| 5,666,504 | A | 9/1997 | Crutcher |
| 5,687,331 | A | 11/1997 | Volk et al. |
| 5,696,905 | A | 12/1997 | Reimer et al. |
| 5,726,702 | A | 3/1998 | Hamaguchi et al. |
| 5,745,713 | A | 4/1998 | Ferguson et al. |
| 5,828,419 | A | 10/1998 | Bruette et al. |
| 6,025,837 | A | 2/2000 | Matthews, III et al. |
| 6,925,650 | B1 | 8/2005 | Arsenault et al. |
| 7,150,029 | B1 | 12/2006 | Ebling et al. |
| 2003/0188313 | A1 | 10/2003 | Ellis et al. |
| 2006/0271973 | A1 | 11/2006 | Jerding et al. |
| 2009/0025033 | A1 | 1/2009 | Stautner et al. |

FOREIGN PATENT DOCUMENTS

| | | |
|---|---|---|
| WO | 9501058 A1 | 1/1995 |
| WO | 9627989 A1 | 9/1996 |

OTHER PUBLICATIONS

"Circuit Description of the NE564", Application Note/AN 179, Philip Semiconductors, Dec. 1991, pp. 1-6.

"Clock regenerator with crystal-controlled phase-locked loop VCO (NE564)", Philip Semiconductors, Dec. 1991, pp. 1-10.

"Phase-locked loop", Application NE/SE564, Philip Semiconductors, Aug. 31, 1994, pp. 1-9.

"Frequency thesis with the NE564", Philip Semiconductors, Dec. 1988, pp. 1-3.

"Gateway 2000 Sells Destination Big Screen PC Through Retail Chains; New retail distribution strategy lets consumers experience breakthrough PC", Aug. 20, 1996, pp. 1-4.

"Gateway 2000 Launches Destination Big Screen PC Featuring 31-inch Monitor; New breakthrough system changes how people will use computers", Mar. 21, 1996, pp. 1-6.

"The Big-Tube PCT'S PC Online/Trends", May 28, 1996, pp. 1-3.

"Telefuzion", Internet Article, Mar. 12, 1997, pp. 1-2.

Snider, M., "High-Tech", Now you can tune your TV to the Internet, USA Today, Sep. 18, 1996, pp. 1-2.

"Advanced Power Management (APM)", Bios Interface Specification, Revision 1.1, Sep. 1993, pp. 1-64.

"Personal Television Schedule Service", IBM, Technical Disclosure Bulletin, vol. 39, No. 8, Aug. 1996, pp. 237-244.

"Menu Item with Cipher Lock", News Release.

"Continental Cablevision launches Web site", Internet-based offering includes interactive TV listings, company information, www.freelibrary.com (Nov. 20, 1995), pp. 1-2.

"Rainbow programming Takes Internet Users to the Game with Unique", News Release, Apr. 1996.

"Scientific-Atlanta, General Cable and WorldGate agreement", News Release.

INTEGRATED CONTENT GUIDE FOR INTERACTIVE SELECTION OF CONTENT AND SERVICES ON PERSONAL COMPUTER SYSTEMS WITH MULTIPLE SOURCES AND MULTIPLE MEDIA PRESENTATION

CROSS-REFERENCE TO RELATED APPLICATIONS

This application is a continuation of U.S. patent application Ser. No. 12/180,680, filed Jul. 28, 2008, now U.S. Pat. No. 7,694,235, issued Apr. 6, 2010, which is a continuation of U.S. patent application Ser. No. 10/628,640, filed Jul. 28, 2003, now U.S. Pat. No. 7,418,672, issued on Aug. 26, 2008, which, in turn, is a continuation of U.S. patent application Ser. No. 09/742,602, filed Dec. 21, 2000, now U.S. Pat. No. 6,600,503, issued on Jul. 29, 2003, which, in turn, is a continuation of U.S. patent application Ser. No. 08/726,648, filed Oct. 7, 1996, now U.S. Pat. No. 6,172,677, issued on Jan. 9, 2001, each of which is incorporated by reference herein in its entirety.

BACKGROUND

1. Field of the Invention

This invention relates to a novel system and methodology for providing information with respect to electronic entertainment and more particularly to an information program content guide which provides for related services.

2. Description of the Related Art

Various text based systems for providing information on television shows and the like are now available. However, these devices and/or printed publications are rather limited in their scope. Systems such as the VCR+™ system which employs information found in a local newspaper, provides a code based system which requires that the manual codes printed in a newspaper be entered into a VCR to allow automatic programming of the VCR. This system however, does not allow for an interactive link of the flexibility that is demanded or needed by users at the present time. This invention expands upon, and provides a significant improvement over, the text based preprinted information systems and further provides a mechanism by which additional related services and information can be provided to a user.

Other computer and electronic based systems, such as would be found on a cable system, suffer from various other problems, such as a lack of interactivity and the ability to provide interactive links or for the information to be updated in an easy manner.

SUMMARY OF THE INVENTION

A computer based system is provided in this invention which may use, for example, a personal computer which extracts, consolidates and provides a display mechanism for displaying the various types of information to access from multiple sources of electronic signals and sources for use by an individual. Although this computer system is primarily designed to incorporate a large screen monitor capable for viewing at a distance, this invention should not be considered so limited in its use and may in fact, be used in conjunction with monitors of all sizes. The computer system of this invention incorporates integrated hardware and functionality in which electronic signals from a plurality of sources and of various types can be acquired by the computer system's central processing unit. The system interprets and processes information which is played back and displayed to the user. These signals may be acquired from an analog signal or from a digital signal. Just some of the examples of the signal sources might be standard analog television transmission, which occurs over the air, cable analog television transmissions, digital cable television transmissions, and direct broadcast satellites, either digital or analog. Additional digital information can be carried as part of an analog television signal for example, as part of the vertical blanking interval (VBI) or in other portions of the video and audio wave form, including in the picture portion itself. Digital data may also be acquired by the central processor by cable modem, satellite digital video transmission or over standard telephone lines, including Integrated Services Digital Network (ISDN) wireless transmission, AM/FM radio broadcasts, digital media such as CD ROM, CDI, magnetic diskettes or the like. Further additional information can be acquired from prerecorded items such as would be used in video cassette recorders, audio CD players or the like. This information would then be converted either from its native analog format or reformatted from its stored digital format or transmittal digital format into a data format by which the computer may use this information.

The presentation of this information in a manner which is usable by an average user, is one of the significant features and advantages of this invention. Specifically, the computer system acquires information from a multiplicity of electronic signals and provides a coherent mechanism of presenting this information to a user in a format which is easy to understand and suitable for usage. For example, in the case of broadcast television signals, these signals are received and converted into a moving digital graphical display and the processed signals can then be displayed on a system monitor with the accompanying audio signals being received and converted to digital samples and then replayed through the digital display to analog converters provided in the system. Obviously, the signal acquisition method and apparatus and its processing used to present the signal, either visual or aural, will vary depending upon the type of signal source that is received and the manner in which it is received.

In the case of digital signal sources, the processing method used to interpret and present the signal obviously depends upon the type of digital information. One of the concerns is how the information is contained within the data stream or on the context in which the data is received. The mechanism by which the signal arrives at the computer system obviously may vary as set forth above and this invention should not be limited to the specific methodology of receiving the signal.

In any complex computer system which is capable of receiving and displaying or playing back audio signals, there is obviously a rich and diverse source of signals for entertainment and for content. However, it is difficult for an individual user to select from the wide selection of possible programs and content types in an easy and expeditious manner. In conventional approaches, once a selection is made or in use, it is difficult or time consuming to change to or investigate other signal/content sources without entering complex commands. In the case of searching and finding content delivered over different means (for example, switching from a television broadcast signal and a modem data signal), it may be necessary to consult multiple sources of information or "content guides" to determine what material might be of interest to the user and what is available.

Another problem that is present in prior art systems is the ease with which actions can be prompted to the user on a given signal type and carried out using another signal type. An example of this is an advertisement on television containing a telephone number for placing an order to purchase goods, or a world wide web address, which is displayed as part of a television program. The conventional method of taking action would be for the user to note the telephone number, pick up a telephone, dial the telephone number, request the specific merchandise and provide credit card information or billing information to the operator. If a world wide web address is provided on the television show, it may require several displays of this address before the user can note the exact syntax of the address, copy it down, enter it into his web browser and communicate with this web page.

One of the unique advantages of this invention is an integrated content guide (ICG) with associated features is provided. This content guide provides an integrated method for searching and finding content of interest both within and across pluralities of signal types and programming and provides an integrated approach for the presentation of this information and of advertising information which is sent along with this signal.

An additional advantage of this invention is a mechanism by which links and/or related information, which are (is) kept in the context of the program being viewed or listened to, may be used as part of the content guide.

BRIEF DESCRIPTION OF THE DRAWINGS

Other advantages and novel features of the present invention will become apparent from the following detailed description of the invention when considered in conjunction with the accompanying drawings in which.

DETAILED DESCRIPTION OF PREFERRED EMBODIMENT

Figure 1:
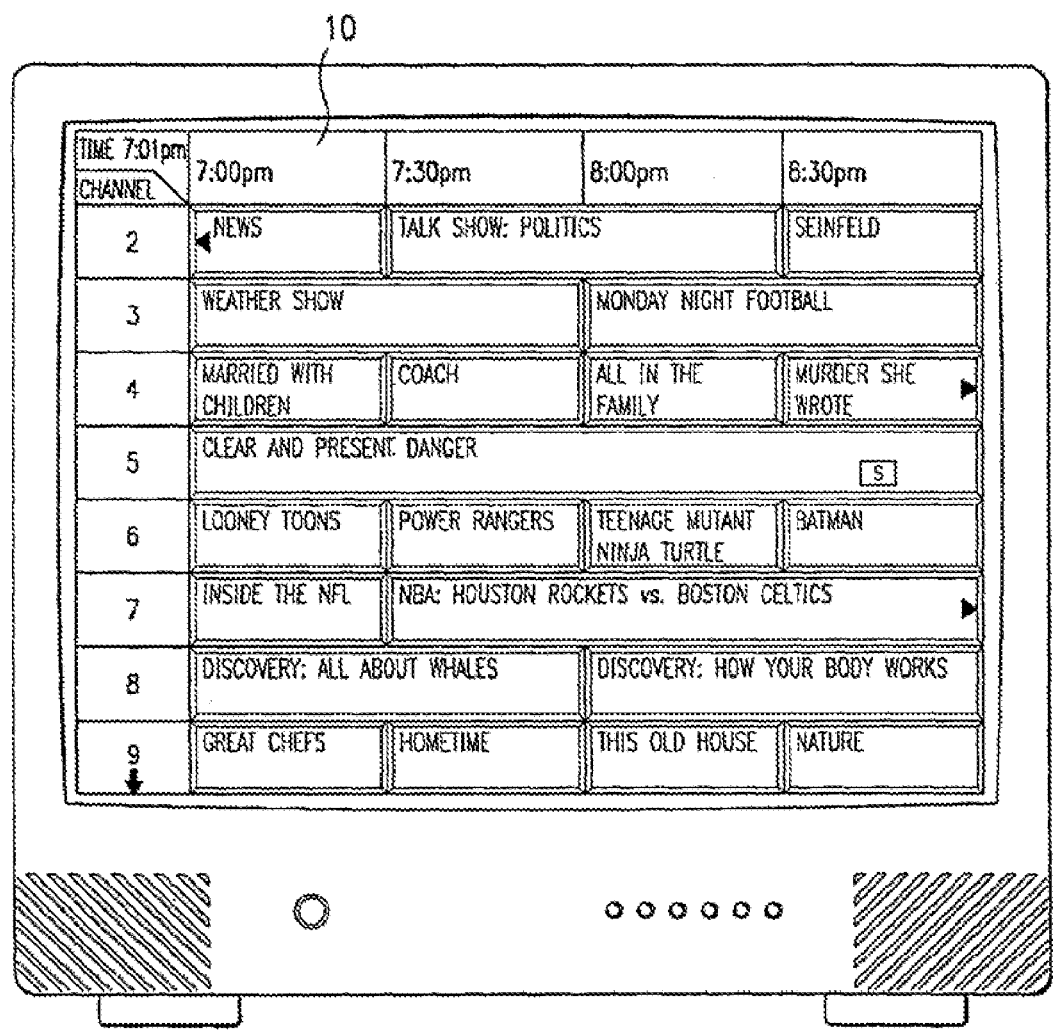
FIG. 1 is a graphical representation of the type of display used in conventional systems.

As can be seen from FIG. 1, a conventional display guide shown for example on cable television, lists current and future shows based upon their start times (10) and the current time. Some of these guides are partially interactive (to a very limited extent) in that a user may scroll through the guide manually. However, these types of content guides are quite limited in nature and do not provide a full measure of flexibility to the user. Furthermore, the information is not generally stored in any meaningful manner, nor is any link provided.

Figure 5:
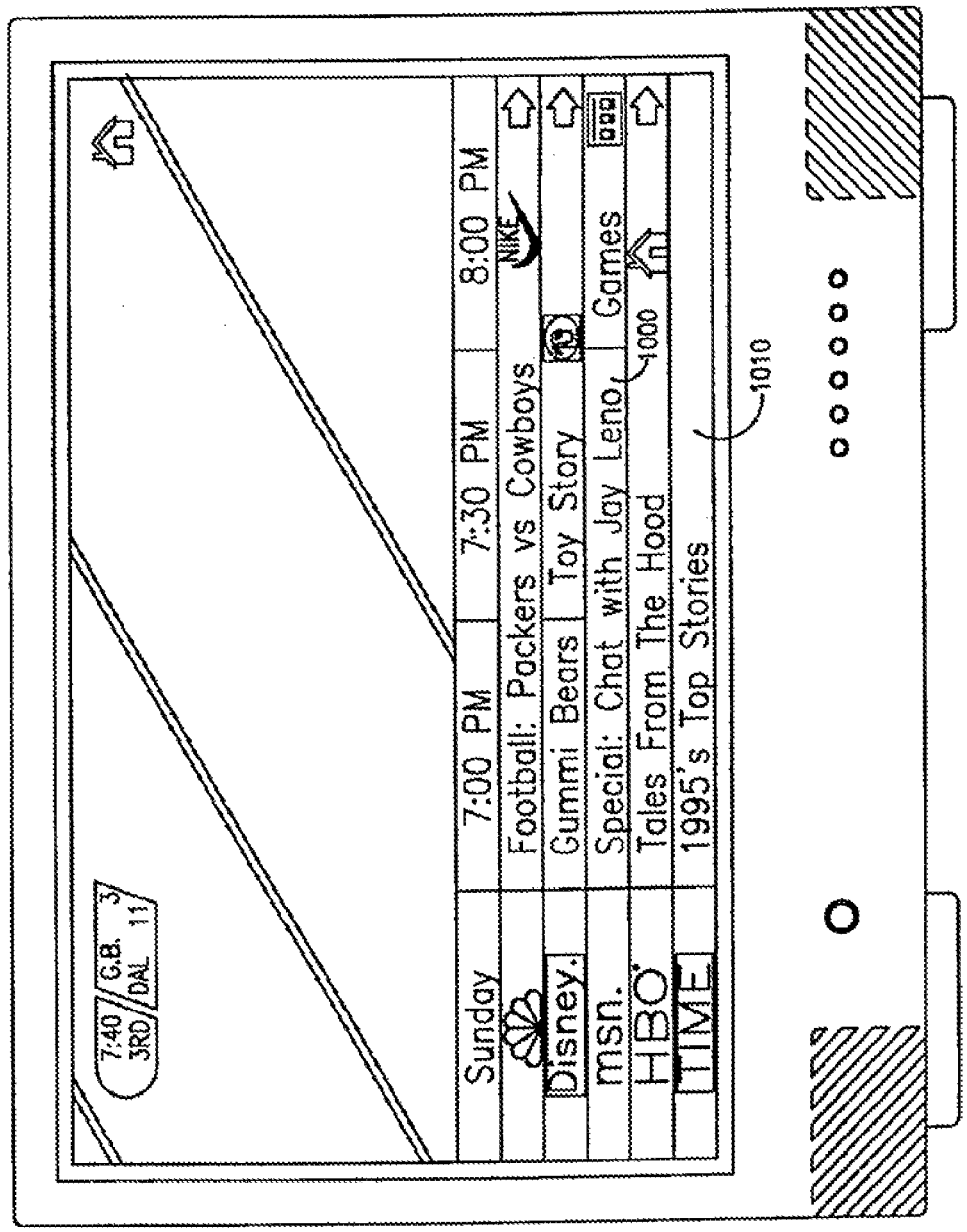
FIG. 5 is an exemplary display according to this invention showing possible television and non-television content items.

The integrated content guide set forth in this invention is a software application which can run, for example, on a general purpose computer which contains information about content availability on a multiplicity of services such as television, digital satellite services, or the like, as well as from diverse sources such as on-line services, Internet services, searchable databases or other programming and information content rich sources, and each entry in the content guide may contain information about services individually or may combine information about service offerings which are related. The content guide of this invention, utilizes a data base containing descriptive information about these services. This content is then displayed. Furthermore, the data base may contain additional information such as advertising graphics or special interest messages, as well as embedded commands which may be accessed to cause the computer system to execute a specific action. Further graphical icons and other means to indicate the availability of additional information, graphics or embedded commands are also provided to a user. From a received signal, information is extracted and provided to the central processor. The software reads this extraction data and forms a data base and provides this information in a graphical manner for the user to navigate. By providing this display and the interaction between this display and the stored data base, this invention effectively consolidates and presents a single coherent and informative controlling front end which may be used to control the computer. This control may allow the user to navigate, select or take other actions on the information, through the various signal types and diverse services provided to the computer system. The information in a grid cell can be a link to an on-line service "program" such as a chat session 1000 as shown in FIG. 5. Also a selection of an on-line game that might be of interest or a "'link" to searchable database, such as is available how' Time® magazine could also be made.

In this invention, a data base for this invention may for example be stored locally on a computer systems' magnetic hard drive or in other types of digital memory storage devices. The data base will be frequently updated to contain updated content information, updated advertisements and other information. This updating provides one of the significant advantages of this invention in that advertisers may, for example, update promotions and the like, as well as updating program information which includes changes in program time, length, content and the like. The data base digital content is acquired and stored on the hard drive utilizing any one of a plurality of digital data acquisition systems that a computer might have. For example, this information can be carried within or acquired from the vertical blanking interval of a broadcast television signal. It may further or alternatively be delivered by using a modem which dials from the computer to an on-line service or it may be provided over a ISDN line, which is kept active, may be provided over a cable modem, or from a fixed wide area network or on a dedicated radio channel or the like.

Figure 2:
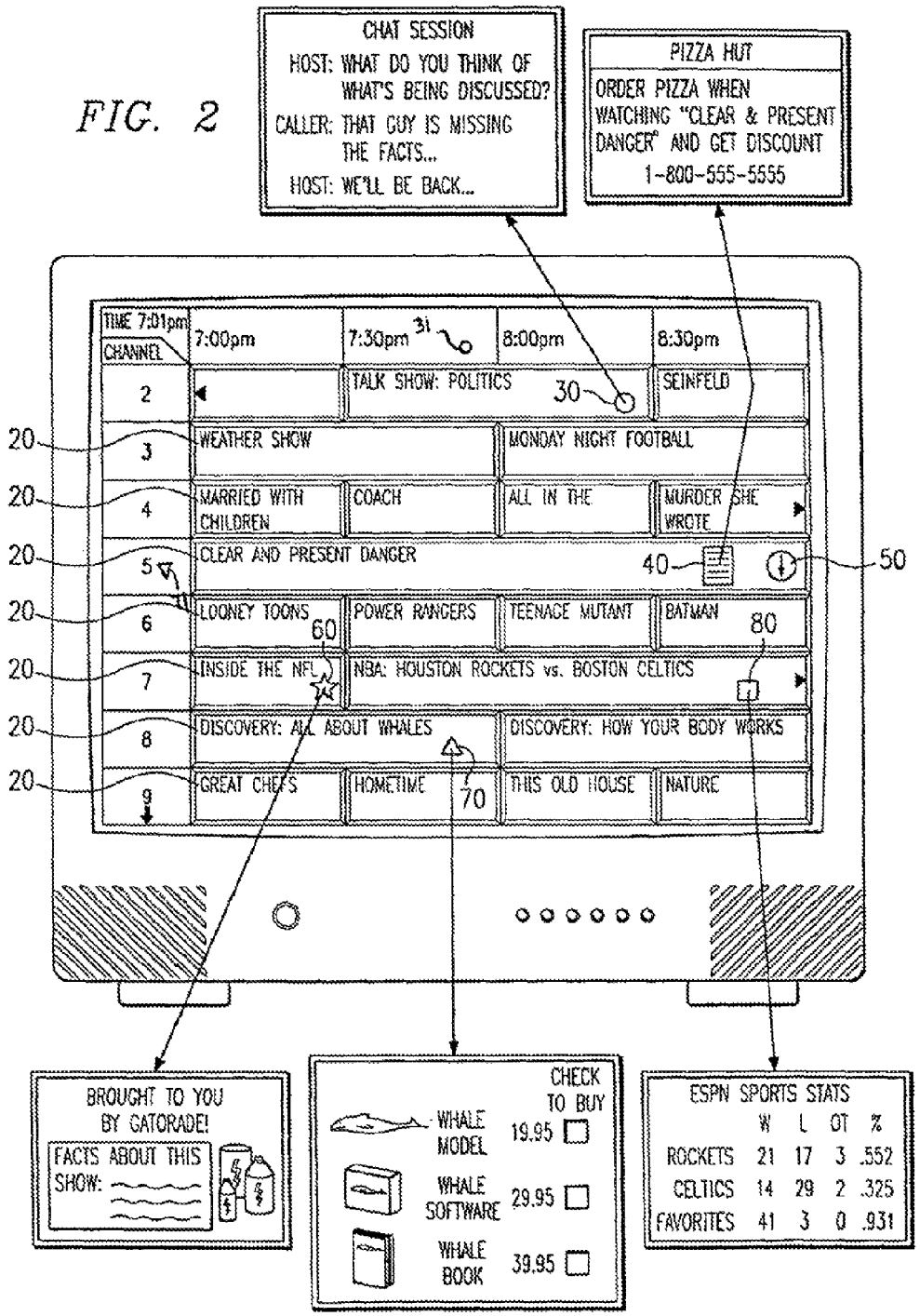
FIG. 2 shows a graphical display as contemplated by this invention.
Figure 3:
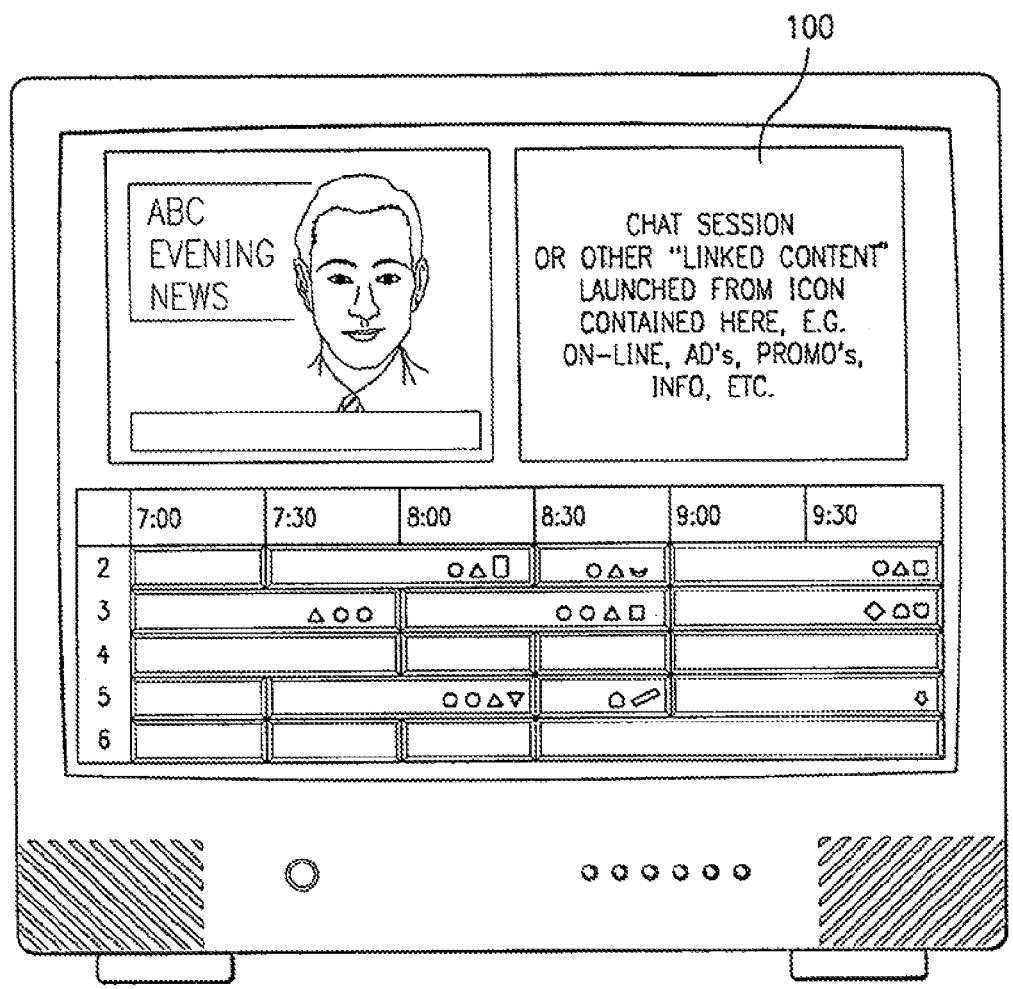
FIG. 3 shows a graphical display as to what would occur when a given link is followed in FIG. 2.
Figure 4:
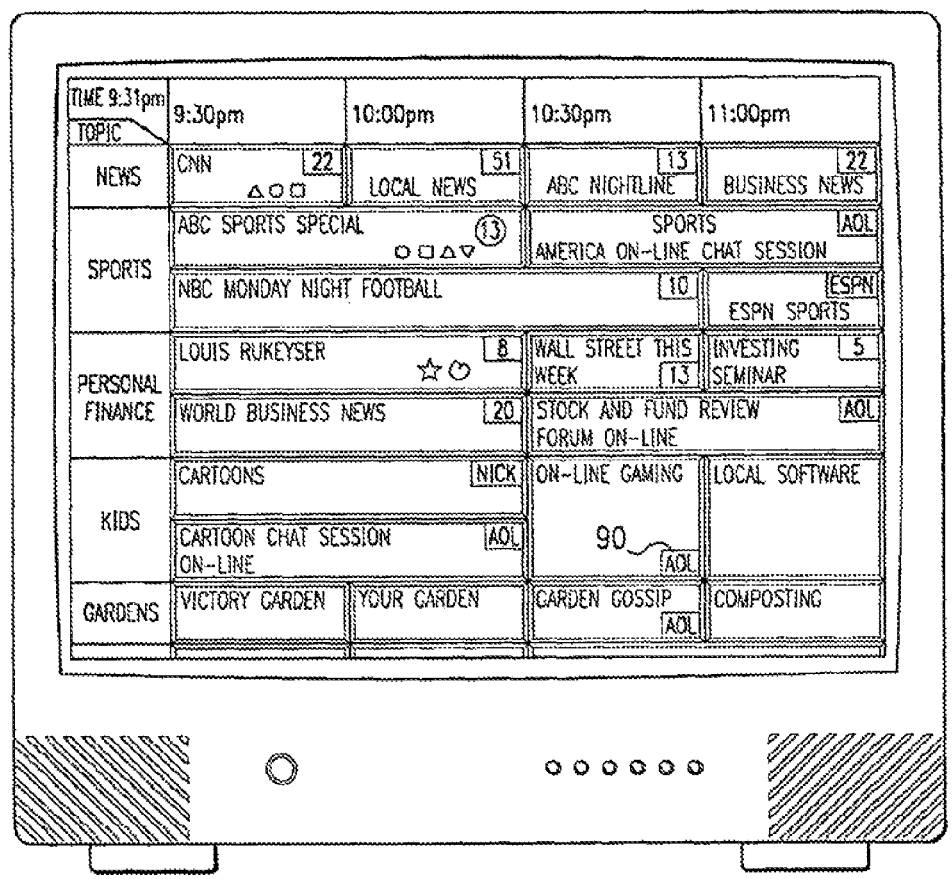
FIG. 4 shows a mechanism by which a rearrangement based upon interest of the display can be accomplished.

It is contemplated that various modes of display can be selected by the user. Each of these modes changes the arrangement of the display of the information, such as is shown in FIGS. 2,3 and 4. Each of the modes is contemplated to generally feature a graphically distinct region in the display. These regions, which are associated with a particular program or an item of interest are shown in FIG. 2, for example. Each of these areas are areas which are called "cells'" (20). A cell may be associated, for example, with an individual television program and could contain the title of a program.

In a default mode, the cells will be arranged graphically according to the channel, (i.e., vertical positioning) and the time span (horizontal dimension) of a program such as is shown in FIG. 2. This is commonly referred to as a "grid guide" and is very similar to the grid guide shown in FIG. 1. In a typical configuration, a television channel number (or other mechanism of identifying an individual station) are listed from top to bottom on the left side of the display and the time of day is provided in equal intervals from left to right at the top of the display. Each of the cells containing a program listing are displayed so as to assume the appropriate channels start time and duration coordinates on the display.

A navigational device, such as an arrow key, mouse or other type of pointing mechanism, either wired or on a wireless remote control, may be used to select or highlight a particular cell.

Additional actions by the user such as pressing the button on the remote may be used to cause the television to tune the channel which was selected. The point control means on the remote may also be used to cause the display to advance or go backward in time or up and down through the available channels. In some cases, pushing a button will reveal additional information contained in the program guide.

The specific method of downloading information may vary and several conventional methods are contemplated. These methods could include extraction of information from the VBI, bulk download from the Internet or other known methods which have been downloaded and stored by the local computer.

The integrated content guide and a stored associated data base provide an additional graphical presentation and navigational front end for a user which integrates diverse content sources and provides embedded control over a computer system used to present the content. The integrated content guide of this invention is unique in that it exploits the fact that it is deployed on a general purpose personal computer system. The combination of the computer functionality along with the television content viewing allows several additional functional items.

Specifically, embedded icons (30, 31, 40, 50, 60, 70, 71, or 80), such as are shown in FIG. 2, can provide links to advertising graphics which are stored locally for example on a hard disk or may be down loaded separately from a web server or from other types of sources. Additional video or sound which is stored locally on the hard disk of the computer system, may also be displayed or played by the user by highlighting a given link. The display of this information after selecting a link can be performed in any of the conventional manners. Selecting an individual icon on the screen can also provide an automatic dial out, and submit a request for information from an on-line service or file server. This dial out can likewise be accomplished in a conventional manner after the selection is made on the video screen. This includes the display (using for example either an embedded browser or an automatically launched separate browser application) and following of hypertext markup line pages (html) which may have active links which will cause further actions in a conventional manner of web browsers or by using other types of search engines.

A further following of different types of links, such as is shown in FIG. 3, can be icons, which are placed there by the content provider which presents prompts to a user for action. For example, a political talk show may have poll results provided by prompting individual viewers for an autodial-in vote on specific questions.

Auxiliary software located on the personal computer and stored on conventional mass storage devices, may also be tied to an individual item in the program content. For example, play-along versions of game shows may be delivered along with the program guide content, so that the user can play along at home while the same game is being played on the television show.

Further selections may cause the delivery of items, such as test versions of programs or in fact, full versions of software, if pre-programmed credit cad information is provided in the system. All of these requests may be accomplished by conventional means. However the display of this information in a content guide in a manner contemplated by this invention, is accomplished by the integrated data base arrangement of this invention which is also presented in the context of entertainment programming information.

One of the novel and un-obvious features of this invention is that it provides a means to place advertising and/or promotional opportunities where and when they can be easily accessed in a user's 'moment of interest". A moment of interest occurs when a user is attracted to the content guide listing because of his/her interest. For example the placing of an advertisement to attract a baseball fan in a listing for a baseball game takes advantage of the "moment of interest" generated by the listing. A "'moment of interest'" occurs in the context of using the guide of this invention, which contains among other items entertainment programming information in a television framework.

Various Modes of Display

Each of the cells shown in FIGS. 2, 3, 4 and 5 contain some type of information about the particular contents available from a source. By providing a uniform appearance of the cells, the sequence of computational steps required to access individual contents and services, may be aggregated and displayed in a given cell or displayed by an icon placed within a cell. From the user's standpoint, it will appear that a single action, such as positioning an on-screen cursor or pointing device over a particular icon and then pushing the button is all that is necessary. This launching of an action provides a uniform and consistent method to access the listed content or service. This launching may also use a conventional double click method or may be a voice activated command or the like. However, the uniform arrangement of selecting an action to be accomplished, is a significant feature of this invention.

Upon selecting an individual icon or a content within a cell, various actions are taken. These actions are generally conventional in nature. However tying them to a given icon on a content guide is new to this invention. Specifically, by selecting a given icon within a cell, a television program may be selected, the tuner arrangement may be forced to a given channel, as well as executing a series of start up commands in the computer to select both a video and audio channel, which may be provided by separate sources or paths. If an icon such as icon 30 is selected, such as shown in FIG. 2, which is labeled "chat session", an individual interactive text based type of chat or an audio chat arrangement can be provided to the user. Selecting this icon would start an online service software application, provide a pre-stored user name into a user named field, start the dialing to connect to the on-line service, provide for the connection to be completed, log on to the on-line service, log on to the given chat session in an automatic matter by extracting from the data base the appropriate sequence of commands to execute and attach to a given chat session by substituting into this pre-programmed sequence of commands, for which the information is provided in the content guide.

In the case of viewing an advertisement or offer of merchandise, such as is shown in FIG. 2, an order can be placed, for example, for a pizza from a national or local chain, by selecting for example icon 40. An automated sequence of events performed by the computer would then extract a proper telephone number from the data base, dial the particular number and place the user in a situation where they are in voice contact with the pizza restaurant or alternatively, provide for an automatic selection of the specifications of their desired pizza.

Additional Features

Additional opportunities or icons may likewise be provided on the screen which may be constantly updated. These icons are tangible controls used to cause the computer to take an action based upon the opportunity. These opportunities are defined by the entertainment programming context and the interest of a given user. Examples of this would be items such as, sports scores and the like, which would cause the computer to execute a series of commands that are embedded or placed in the data base directory, which would then place a telephone call from the unit's computer modem line to obtain the most recent scores. Further context based related icons can be used to select sports related memorabilia or merchandise, as well as retrieve additional sports information, which would have more depth than simply the scores, such as who scored. Still further in depth, a selected icon 80 may provide a link to other commentary on such things as team standings in a league, the performance of a particular player or other statistics for instance.

Further the icons may be animated and have the dimensional looks or arrangements to them.

Integration of Multiple Sources

The content guide of this invention provides a single point of entry to multiple sources. For example, listing the cells will not be restricted to individual television channel contents, but may be mixed with other service offerings. As an example, the user may have either digital satellite delivery, cable access, and conventional over the air broadcast offerings. Further, computer based text and database systems, such as an on-line chat service which could, for example, be provided by American On-Line@ (AOL) or CompuServeB (CIS) (icon go), may be presented. This presentation might be next to a program listing for a given movie which may be viewable either on a conventional broadcast channel or in a digital satellite channel. Usenet groups related to the program could also be tied to a given cell. Also searchable databases could likewise be placed on the same screen such as the "Time® magazine archives 1010 in FIG. 5.

Clicking on the chat session cell will cause the computer to execute those embedded commands which are necessary to activate a specified chat session and this chat session can be tied directly to a movie cell or other television program cell, such as is shown in FIG. 3. The video window (100) as shown in FIG. 3 when highlighted and selected (for example), would cause the television portion of the computer to tune to that channel. This will allow a user an easy mechanism to engage in a given chat session which is tied to a given television show. This also provides a simplified mechanism by which the user can select the chat session. By providing an arrangement in which the chat session is tied to a given movie for example, it provides an uniform ease of access for a user.

Additionally, as part of this integration of multiple sources, a given advertiser may provide as part of their program, information for example to automatically connect to a world wide web page or the like, which may also be selected by a user without having to retype the information.

By having the computerized data base that is part of this invention, it is possible to store information with respect to a given user to learn their usage pattern. Log files are easily maintained which will store a pattern of uses. This information can be used by the computer by retrieval of the information from the log files to form a data base which is correlated by the computer to determine likely settings and preferred channels and programs that an individual user might use. As an example, if a user four nights in a: row watches the 10 O'clock news on a particular channel, the computer can recognize this fact and present an option to the user to turn on either immediately before the 10 O'clock news or exactly at the 10 O'clock news hour and tune to that channel.

By issuing an additional command to the system, a rearrangement and resorting of the display of the individual cells can be implemented. A conventional filtering type of command can likewise be implemented so as to provide the display in the manner contemplated by FIG. 4.

What is claimed is:

1. A computer program product stored in digital media and including executable code that, when executed, is configured to cause a data processing apparatus to:
   receive a search request related to a plurality of content information files stored in a searchable database;
   execute a search of the searchable database to obtain search results including a subset of the content information files which correspond to the search request;
   determine supplemental content information associated with at least one content information file of the subset of content information files;
   provide a graphical user interface within a display, the graphical user interface providing a content guide that includes an organized display of a plurality of selectable elements corresponding respectively to the subset of content information files;
   provide a graphical reference to the supplemental content information within a selectable element of the plurality of selectable elements;
   receive a selection of the graphical reference; and
   execute an action based on the selection and on the supplemental content information.

2. The computer program product of claim 1, wherein the executable code, when executed, is configured to cause the data processing apparatus to:
   store usage information of a user with respect to the searchable database;
   determine additional content information files based on the usage information; and
   provide an option to the user for future use of the additional content information files.

3. The computer program product of claim 1, wherein the executable code, when executed, is configured to cause the data processing apparatus to:
   record previous media consumption of a user; and
   recommend future media to consume, based on the previous media consumption.

4. The computer program product of claim 1, wherein the executable code, when executed, is configured to cause the data processing apparatus to:
   receive a selection of a selected content information file from the subset of content information files; and
   initiate a purchase of the selected content information file, based on the selection.

5. The computer program product of claim 1, wherein the action includes initiating a network communication, based on the selection of the graphical reference.

6. The computer program product of claim 1, wherein the action includes initiating a network communication using a network connection, the network communication including user-generated content that is related to a corresponding content information file of the selectable element, and which is received at a server and subsequently provided over the network to at least a second user, by the server.

7. The computer program product of claim 1, wherein the action includes initiating a network communication, the network communication including user-generated content that is subsequently provided within a user interface by a server.

8. The computer program product of claim 1, wherein the action includes initiating a network communication, the network communication including content related to the content information file associated with the selectable element.

9. The computer program product of claim 1, wherein the action includes initiating a network communication, the network communication including real-time communication.

10. The computer program product of claim 1, wherein the action includes initiating a network communication, the network communication including real-time communication of content received from a user.

11. The computer program product of claim 1, wherein the executable code, when executed, is configured to cause the data processing apparatus to execute the action including initiating a network communication, including providing a user interface in conjunction with the content guide.

12. The computer program product of claim 1, wherein the action includes including initiating a network communication, including providing an advertisement in conjunction with the content guide.

13. The computer program product of claim 1, wherein the action includes initiating a network communication, the network communication including a chat session that is related in topic to the content information file corresponding to the selectable element.

14. The computer program product of claim 1, wherein the supplemental information identifies audio related to a corresponding content information file of the selected graphical reference, and wherein the action includes output of audio related to the corresponding content information file.

15. The computer program product of claim 1, wherein the plurality of content information files comprises a plurality of audio files containing one or more song portions.

16. The computer program product of claim 1, wherein the plurality of content information files comprises a plurality of video files.

17. The computer program product of claim 1, wherein the plurality of content information files comprises audio-video files containing one or more television programs.

18. The computer program product of claim 1, wherein the plurality of content information files comprises a plurality of software applications.

19. The computer program product of claim 1, wherein the plurality of content information files comprises a plurality of audio-video broadcasts.

20. The computer program product of claim 1, wherein at least a portion of the database is stored remotely and accessed over a computer network.

21. The computer program product of claim 20 wherein at least a portion of the database is stored locally and at least some of the content information files stored therein are obtained from the portion stored remotely.

22. The computer program product of claim 1, wherein the supplemental content information is stored in the database.

23. The computer program product of claim 1, wherein the supplemental content information includes descriptive information about a corresponding content information file.

24. The computer program product of claim 1, wherein the supplemental content information includes advertisement information related to a corresponding content information file.

25. The computer program product of claim 1, wherein the supplemental content information includes a command to obtain software related to the content information file.

26. The computer program product of claim 1, wherein the supplemental content information includes a command to obtain an audio file related to the content information file.

27. The computer program product of claim 1, wherein the supplemental content information includes a command to initiate a purchase related to the content information file.

28. The computer program product of claim 1, wherein the content guide includes the organized display including a grid of the selectable elements, each selectable element identifying its corresponding content information file.

29. The computer program product of claim 1, wherein the content guide includes the organized display including a list of the selectable elements, each selectable element identifying its corresponding content information file.

30. The computer program product of claim 1, wherein the content guide includes the organized display including the selectable elements, each selectable element including a reference to its corresponding content information file.

31. The computer program product of claim 1, wherein the content guide includes the organized display including the selectable elements, each selectable element including descriptive information about its corresponding content information file.

32. The computer program product of claim 1, wherein the content guide is provided within a browser application.

33. The computer program product of claim 1, wherein the selectable element is selectable to enable purchase of the content information file.

34. The computer program product of claim 1, wherein the selectable element is selectable to enable an audio output of the content information file.

35. The computer program product of claim 1, wherein the selectable element is selectable to enable a video output of the content information file.

36. The computer program product of claim 1, wherein the selectable element includes a link to the content information file.

37. The computer program product of claim 1, wherein the graphical reference includes a link to the supplemental content information.

38. The computer program product of claim 1, wherein the graphical reference includes a link to a corresponding content information file.

39. The computer program product of claim 1, wherein the graphical reference includes an icon representing supplemental content information related to the selectable element.

40. The computer program product of claim 1, wherein the action includes initiating a purchase of an audio file.

41. The computer program product of claim 1, wherein the action includes initiating purchase of a video file.

42. A computer-implemented method comprising:
  receiving a search request related to a plurality of content information files stored in a searchable database;
  executing a search of the searchable database to obtain search results including a subset of the content information files which correspond to the search request;
  determining supplemental content information associated with at least one content information file of the subset of content information files;
  providing a graphical user interface within a display, the graphical user interface providing a content guide that includes an organized display of a plurality of selectable elements corresponding respectively to the subset of content information files;
  providing a graphical reference to the supplemental content information within a selectable element of the plurality of selectable elements;
  receiving a selection of the graphical reference; and
  executing an action based on the selection and on the supplemental content information.

43. The computer-implemented method of claim 42, further comprising:
  storing usage information of a user with respect to the searchable database;
  determining additional content information files based on the usage information; and providing an option to the user for future use of the additional content information files.

44. The computer-implemented method of claim 42, further comprising:
recording previous media consumption of a user; and
recommending future media to consume, based on the previous media consumption.

45. The computer-implemented method of claim 42, further comprising:
receiving a selection of a selected content information file from the subset of content information files; and
initiating a purchase of the selected content information file, based on the selection.

46. The computer-implemented method of claim 42, wherein the action includes initiating a network communication, based on the selection of the graphical reference.

47. The computer-implemented method of claim 42, wherein the action includes initiating a network communication using a network connection, the network communication including user-generated content that is related to a corresponding content information file of the selectable element, and which is received at a server and subsequently provided over the network to at least a second user, by the server.

48. The computer-implemented method of claim 42, wherein the action includes initiating a network communication, the network communication including user-generated content that is subsequently provided within a user interface by a server.

49. The computer-implemented method of claim 42, wherein the action includes initiating a network communication, the network communication including content related to the content information file associated with the selectable element.

50. The computer-implemented method of claim 42, wherein the action includes initiating a network communication, the network communication including real-time communication.

51. The computer-implemented method of claim 42, wherein the action includes initiating a network communication, the network communication including real-time communication of content received from a user.

52. The computer-implemented method of claim 42, wherein the executable code, when executed, is configured to cause the data processing apparatus to execute the action including initiating a network communication, including providing a user interface in conjunction with the content guide.

53. The computer-implemented method of claim 42, wherein the action includes including initiating a network communication, including providing an advertisement in conjunction with the content guide.

54. The computer-implemented method of claim 42, wherein the action includes initiating a network communication, the network communication including a chat session that is related in topic to the content information file corresponding to the selectable element.

55. The computer-implemented method of claim 42, wherein the supplemental information identifies audio related to a corresponding content information file of the selected graphical reference, and wherein the action includes output of audio related to the corresponding content information file.

56. The computer-implemented method of claim 42, wherein the plurality of content information files comprises a plurality of audio files containing one or more song portions.

57. The computer-implemented method of claim 42, wherein the plurality of content information files comprises a plurality of video files.

58. The computer-implemented method of claim 42, wherein the plurality of content information files comprises audio-video files containing one or more television programs.

59. The computer-implemented method of claim 42, wherein the plurality of content information files comprises a plurality of software applications.

60. The computer-implemented method of claim 42, wherein the plurality of content information files comprises a plurality of audio-video broadcasts.

61. The computer-implemented method of claim 42, wherein at least a portion of the database is stored remotely and accessed over a computer network.

62. The computer-implemented method of claim 61, wherein at least a portion of the database is stored locally and at least some of the content information files stored therein are obtained from the portion stored remotely.

63. The computer-implemented method of claim 42, wherein the supplemental content information is stored in the database.

64. The computer-implemented method of claim 42, wherein the supplemental content information includes descriptive information about a corresponding content information file.

65. The computer-implemented method of claim 42, wherein the supplemental content information includes advertisement information related to a corresponding content information file.

66. The computer-implemented method of claim 42, wherein the supplemental content information includes a command to obtain software related to the content information file.

67. The computer-implemented method of claim 42, wherein the supplemental content information includes a command to obtain an audio file related to the content information file.

68. The computer-implemented method of claim 42, wherein the supplemental content information includes a command to initiate a purchase related to the content information file.

69. The computer-implemented method of claim 42, wherein the content guide includes the organized display including a grid of the selectable elements, each selectable element identifying its corresponding content information file.

70. The computer-implemented method of claim 42, wherein the content guide includes the organized display including a list of the selectable elements, each selectable element identifying its corresponding content information file.

71. The computer-implemented method of claim 42, wherein the content guide includes the organized display including the selectable elements, each selectable element including a reference to its corresponding content information file.

72. The computer-implemented method of claim 42, wherein the content guide includes the organized display including the selectable elements, each selectable element including descriptive information about its corresponding content information file.

73. The computer-implemented method of claim 42, wherein the content guide is provided within a browser application.

74. The computer-implemented method of claim 42, wherein the selectable element is selectable to enable purchase of the content information file.

75. The computer-implemented method of claim 42, wherein the selectable element is selectable to enable an audio output of the content information file.

76. The computer-implemented method of claim 42, wherein the selectable element is selectable to enable a video output of the content information file.

77. The computer-implemented method of claim 42, wherein the selectable element includes a link to the content information file.

78. The computer-implemented method of claim 42, wherein the graphical reference includes a link to the supplemental content information.

79. The computer-implemented method of claim 42, wherein the graphical reference includes a link to a corresponding content information file.

80. The computer-implemented method of claim 42, wherein the graphical reference includes an icon representing supplemental content information related to the selectable element.

81. The computer-implemented method of claim 42, wherein the action includes initiating a purchase of an audio file.

82. The computer-implemented method of claim 42, wherein the action includes initiating purchase of a video file.

83. A computer program product stored in digital media and including executable code that, when executed, is configured to cause a data processing apparatus to:
receive a search request related to media files stored within a database;
execute a search of the media files, based on the search request, to provide search results including a subset of the media files;
determine supplemental information for each media file of the search results;
provide a graphical user interface within a display, the graphical user interface providing a content user interface that includes an organized display of a plurality of selectable elements corresponding respectively to the media files of the search results;
provide, within each selectable element, an icon related to corresponding supplemental information about a corresponding media file;
receive a selection of a selected icon associated with a selected media file of the search results; and
execute, in response to the selection, an action related to the selected media file and corresponding supplemental information.

84. The computer program product of claim 83, wherein the supplemental information identifies media related to the selected media file, and wherein selection of the icon initiates the action including output of the media related to the selected media file.

85. The computer program product of claim 83, wherein the supplemental information includes identification of a server, and wherein selection of the icon initiates the action including executing a network communication with the server and related to the selected media file.

86. The computer program product of claim 83, wherein the supplemental information identifies purchase information related to the selected media file, and wherein selection of the icon initiates the action including purchase of the selected media file.

87. A computer-implemented method comprising:
receiving a search request related to media files stored within a database;
executing a search of the media files, based on the search request, to provide search results including a subset of the media files;
determining supplemental information for each media file of the search results;
providing a graphical user interface within a display, the graphical user interface providing a content user interface that includes an organized display of a plurality of selectable elements corresponding respectively to the media files of the search results;
providing, within each selectable element, an icon related to corresponding supplemental information about a corresponding media file;
receiving a selection of a selected icon associated with a selected media file of the search results; and
executing, in response to the selection, an action related to the selected media file and corresponding supplemental information.

88. The computer-implemented method of claim 87, wherein the supplemental information identifies media related to the selected media file, and wherein selection of the icon initiates the action including output of the media related to the selected media file.

89. The computer-implemented method of claim 87, wherein the supplemental information includes identification of a server, and wherein selection of the icon initiates the action including executing a network communication with the server and related to the selected media file.

90. The computer-implemented method of claim 87, wherein the supplemental information identifies purchase information related to the selected media file, and wherein selection of the icon initiates the action including purchase of the selected media file.

* * * * *

UNITED STATES PATENT AND TRADEMARK OFFICE
CERTIFICATE OF CORRECTION

PATENT NO. : 8,108,797 B2  
APPLICATION NO. : 12/700429  
DATED : January 31, 2012  
INVENTOR(S) : John P. Stautner et al.

Page 1 of 1

It is certified that error appears in the above-identified patent and that said Letters Patent is hereby corrected as shown below:

In column 1, line 12, after "issued" insert -- on --.

Signed and Sealed this  
First Day of May, 2012

David J. Kappos  
*Director of the United States Patent and Trademark Office*